(12) United States Patent
Tsuzuki et al.

(10) Patent No.: US 10,146,099 B2
(45) Date of Patent: Dec. 4, 2018

(54) OPTICAL MODULATOR

(71) Applicant: NIPPON TELEGRAPH AND TELEPHONE CORPORATION, Tokyo (JP)

(72) Inventors: Ken Tsuzuki, Atsugi (JP); Shin Kamei, Atsugi (JP); Makoto Jizodo, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/528,874

(22) PCT Filed: Dec. 8, 2015

(86) PCT No.: PCT/JP2015/006112
§ 371 (c)(1),
(2) Date: May 23, 2017

(87) PCT Pub. No.: WO2016/092829
PCT Pub. Date: Jun. 16, 2016

(65) Prior Publication Data
US 2017/0336696 A1    Nov. 23, 2017

(30) Foreign Application Priority Data
Dec. 9, 2014   (JP) ................. 2014-249405

(51) Int. Cl.
*G02F 1/225* (2006.01)
*G02F 1/21* (2006.01)

(52) U.S. Cl.
CPC ...... *G02F 1/2257* (2013.01); *G02F 2001/212* (2013.01); *G02F 2201/063* (2013.01); *G02F 2201/127* (2013.01)

(58) Field of Classification Search
CPC ............. G02F 1/2257; G02F 2201/127; G02F 2201/063; G02F 2201/212; G02F 1/015; G02F 1/025; G02B 6/1228
(Continued)

(56) References Cited

U.S. PATENT DOCUMENTS 8,737,772 B2 *   5/2014   Dong ..................... G02F 1/025
                                                                 385/2
2010/0021124 A1   1/2010   Koos et al.
(Continued)

FOREIGN PATENT DOCUMENTS

GB          2373921         10/2002
JP          2011-75917      4/2011
(Continued)

OTHER PUBLICATIONS

Kazuhiro Goi et al., *20 Gbps Binary Phase Shirt Keying using Silicon Mach-Zehnder Push-Pull Modulator*, The Institute of Electronics, Information and Communication Engineers, Society Conference 2012, C-3-50, 2012, 1 page, partial translation.
(Continued)

*Primary Examiner* — Michael Mooney
(74) *Attorney, Agent, or Firm* — Workman Nydegger

(57) ABSTRACT

The present invention provides an optical modulator including a substrate and a phase modulation portion on the substrate. The phase modulation portion includes an optical waveguide comprised of a first clad layer, a semiconductor layer that is laminated on the first clad layer and has a refraction index higher than the first clad layer and a second clad layer that is laminated on the semiconductor layer and has a refraction index lower than the semiconductor layer, a first traveling wave electrode, and a second traveling wave electrode. The semiconductor layer includes a rib that is formed in the optical waveguide in an optical axis direction
(Continued)

PRIOR ART and is a core of the optical waveguide, a first slab that is formed in the optical axis direction in one side of the rib, a second slab that is formed in the optical axis direction in the other side of the rib, a third slab that is formed in the first slab in the optical axis direction at the opposite side to the rib, and a fourth slab that is formed in the second slab in the optical axis direction at the opposite side to the rib. The first slab is formed to be thinner than the rib and the third slab, and the second slab is formed to be thinner than the rib and the fourth slab.

7 Claims, 12 Drawing Sheets

(58) Field of Classification Search
USPC .......................................................... 385/1–3
See application file for complete search history.

(56) References Cited

U.S. PATENT DOCUMENTS

| | | |
|---|---|---|
| 2014/0233878 A1 | 8/2014 | Goi et al. |
| 2014/0286647 A1 | 9/2014 | Ayazi et al. |

FOREIGN PATENT DOCUMENTS

| | | |
|---|---|---|
| JP | 2011075917 A | 4/2011 |
| JP | 2013-25011 | 2/2013 |
| JP | 2013025011 A | 2/2013 |
| WO | WO 2014155450 | 10/2014 |

OTHER PUBLICATIONS

Thierry Pinguet et al., *A 1550 nm 10 Gbps Optical Modulator with Integrated Driver in 130 nm CMOS*, Group IV Photonics, 2007 4$^{th}$ IEEE International Conference 2007, pp. 186-188.

International Preliminary Report on Patentability and Written Opinion dated Jun. 22, 2017, issued in PCT Application No. PCT/JP2015/006112, filed Dec. 8, 2015.

Application No. 15866773.3, dated Jun. 22, 2018, Extended European Search Report.

Application No. 11201704080Y, dated Apr. 23, 2018, Singapore Office Action.

* cited by examiner

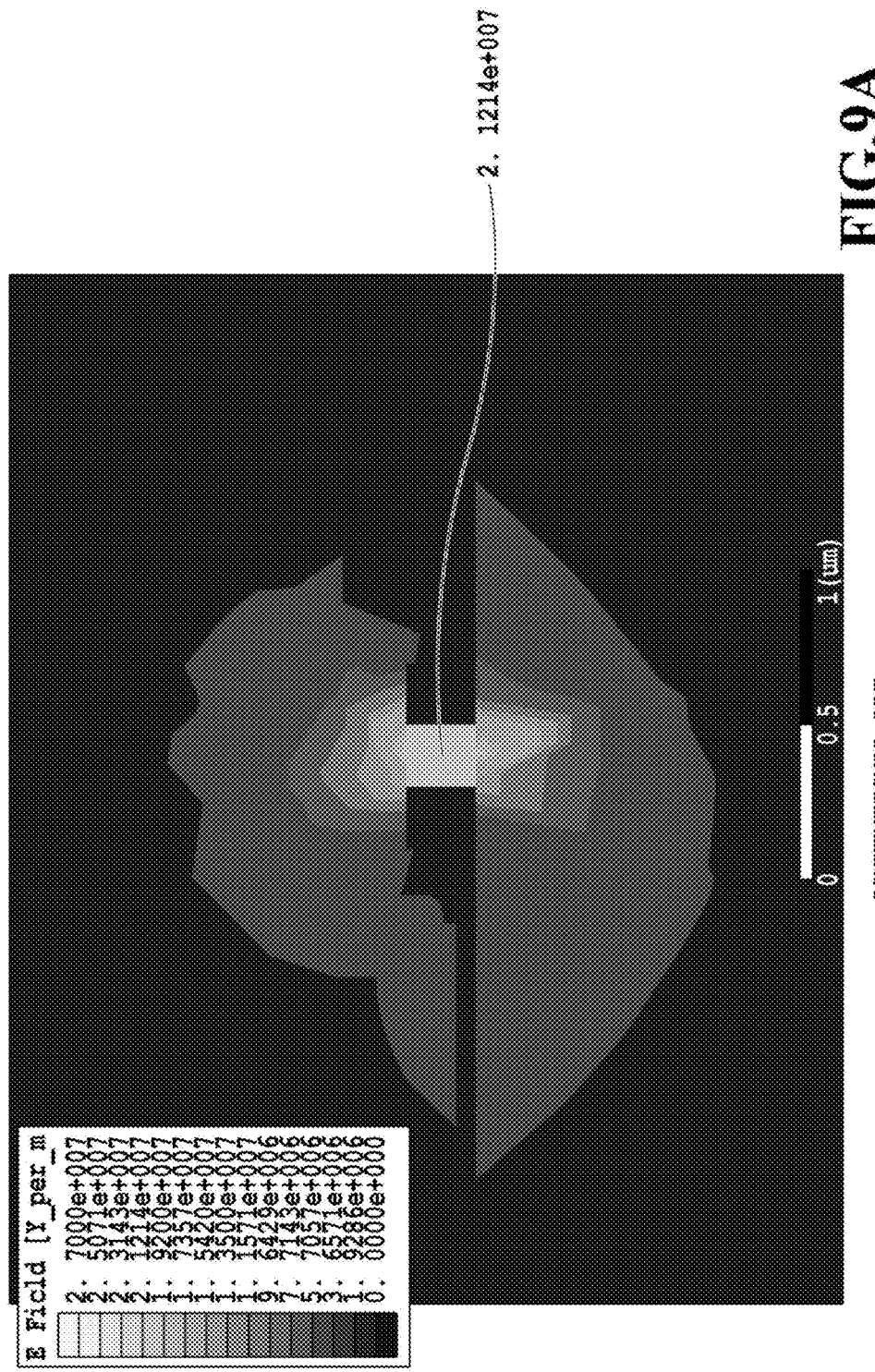

OPTICAL MODULATOR

TECHNICAL FIELD

The present invention relates to optical modulators that are used in optical communication systems or optical information processing systems, and in more detail, to a Mach-Zehnder type optical modulator that operates in a low voltage and is small in a waveguide loss.

BACKGROUND ART

A Mach-Zehnder type (MZ type) optical modulator has the structure that light incident upon an optical waveguide is branched into two waveguides by an optical branching filter and the branched lights are propagated in a constant length, which thereafter, are again multiplexed by an optical multiplexer. The two branched optical waveguides are respectively provided with phase modulators each of which changes a phase of light propagating in each of the optical waveguides to change an interference condition of the lights to be multiplexed, thus modulating intensity of the light or a phase of the light.

An example of a material configuring the optical waveguide in the Mach-Zehnder type (MZ type) optical modulator may include a dielectric body of $LiNbO_3$ or the like, or a semiconductor of InP, GaAs, Si or the like. When a voltage is applied to the optical waveguide by traveling wave electrodes arranged in the vicinity of the optical waveguide, the phase of the light is changed. In regard to a principle of changing the phase of the light, primarily a Pockels effect is used in $LiNbO_3$, a Pockels effect and a quantum confined stark effect (QCSE) are used in InP and GaAs, and a carrier plasma effect is used in Si.

For performing optical communications at high speeds and in low-consumption power, it requires an optical modulator high at modulating speeds and low in a driving voltage. For performing optical modulation at high speeds of 10 Gbps or more and in an amplitude voltage of several volts, it requires traveling wave electrodes of matching and propagating a high-speed electrical signal and a speed of the light propagating in the phase modulator and performing a mutual function thereof. At present, there has been put into practice an optical modulator with the traveling wave electrode an electrode length of which has several millimeters to several ten millimeters (for example, NPL 1). The optical modulator using the traveling wave electrode is required to have an electrode structure and an optical waveguide structure that are low in an optical loss and small in reflection in such a manner as to be capable of propagating the electrical signal and the light propagating in the waveguide without reducing the intensity thereof.

An example of the MZ type modulator may include a silicon optical modulator an optical waveguide of which is formed of silicon. The silicon optical modulator is produced such that a fine line of Si is processed in such a manner that light can wave-guide on a silicon-on-insulator (SOI) layer from an SIO substrate in which a thin film of Si is attached on an oxide film (BOX) layer a surface of an Si substrate of which is thermally-oxidized, dopants are thereafter injected into the processed fine line to become a p-type/n-type semiconductor, and deposit of $SiO_2$ to be clad layers of light, formation of traveling wave electrodes and the like are performed. At this time, the waveguide of the light is necessary to be designed and processed to make the optical loss small. The doping for p-type and n-type of the processed fine line and production of the traveling wave electrode are required to be designed and processed to control loss generation of the light to be small and reflection and a loss of a high-speed electrical signal to be small.

FIG. 1 is an upper surface transparent diagram illustrating the configuration of a conventional MZ type optical modulator 100. The MZ type optical modulator 100 is a silicon optical modulator, and includes an input optical modulator 101, an optical branching filter 102 for branching the light incident from the input optical modulator 101 in a ratio of 1:1, and optical waveguides 103 and 104 upon which light is incident from the optical branching filter 102. The MZ type optical modulator 100 includes a phase modulation portion 111 that modulates a phase of light propagating in the optical waveguide 103, a phase modulation portion 112 that modulates a phase of light propagating in the optical waveguide 104, an optical waveguide 105 for propagating the light from the phase modulation portion 111, and an optical waveguide 106 for propagating the light from the phase modulation portion 112. The MZ type optical modulator 100 includes an optical multiplexer 107 that multiplexes the lights, each phase of which is modulated, from the optical waveguides 105 and 106, and an output optical waveguide 108 that outputs the light multiplexed by the optical multiplexer 107.

The phase modulation portion 111 includes traveling wave electrodes 121 and 122 extending in an x axis direction, and an optical waveguide 123, and by applying a voltage to the traveling wave electrodes 121 and 122, changes a phase of light that wave-guides in the optical waveguide 123. The phase modulation portion 112 includes traveling wave electrodes 124 and 125 extending in the x axis direction, and an optical waveguide 126, and by applying a voltage to the traveling wave electrodes 124 and 125, changes a phase of light that wave-guides in the optical waveguide 126. The optical waveguides 123 and 126 each have the structure called a rib waveguide different in thickness, are formed of Si and are provided with $SiO_2$ clad layers formed upward and downward.

FIG. 2 is a cross section illustrating the phase modulation portion 111 of the conventional MZ type optical modulator 100 described in FIG. 1, taken in arrows II-II. FIG. 2 is a cross section illustrating the phase modulation portion 111 in a direction (y-z plane) vertical to a waveguide direction (x axis direction) of light, and the phase modulation portion 111 includes an Si substrate 201, and the optical waveguide 123 formed on the Si substrate. The optical waveguide 123 includes a first $SiO_2$ clad layer 202 on the Si substrate 201, an Si semiconductor layer 203 on the first $SiO_2$ clad layer 202, and a second $SiO_2$ clad layer 204 on the Si semiconductor layer 203. Third clad layers 205, 206 are formed on both sides of the Si semiconductor layer 203. It should be noted that the phase modulation portion 112 also has the same configuration.

The optical waveguide 123 has the structure of the rib waveguide, and the Si semiconductor layer 203 in which light wave-guides is interposed between the first $SiO_2$ clad layer 202 and the second $SiO_2$ clad layer 204. The Si semiconductor layer 203 includes a rib portion A0 that is arranged in an Si semiconductor layer region thick in the center as a core of the optical waveguide 123, and a first slab portion A1 and a second slab portion A2 that are arranged in both sides of the rib portion A0 and are Si semiconductor layer regions thinner than the rib portion A0. The optical waveguide 123 confines the light using a difference in a refraction index between the Si semiconductor layer 203, and the first $SiO_2$ clad layer 202 and the second $SiO_2$ clad layer 204 in the periphery of the Si semiconductor layer 203.

The traveling wave electrode 121 is formed in the x axis direction on an upper surface in an end of the Si semiconductor layer 203 at the opposite side to the rib portion A0 of the first slab portion A1, and the traveling wave electrode 122 is formed in the x axis direction on an upper surface in an end of the Si semiconductor layer 203 at the opposite side to the rib portion A0 of the second slab portion A2.

The Si semiconductor layer 203 has conductivity by doping of atoms such as boron (B), phosphorous (P) or arsenic (As) to Si with a method of implantation of ions or the like. Here, the Si semiconductor layer 203 is formed of four regions that are different in a doping concentration. An end of the first slab portion A1 in the Si semiconductor layer 203 at the opposite side to the rib portion A0 becomes a high-concentration p-type semiconductor region 203-3, and an end of the second slab portion A2 in the Si semiconductor layer 203 at the opposite side to the rib portion A0 becomes a high-concentration n-type semiconductor region 203-4. The Si semiconductor layers 203 at the rib portion A0-side of the first slab portion A1 and at the first slab portion A1-side of the rib portion A0 become an intermediate-concentration p-type semiconductor region 203-1. The Si semiconductor layers 203 at the rib portion A0-side of the second slab portion A2 and at the second slab portion A2-side of the rib portion A0 become an intermediate-concentration n-type semiconductor region 203-2.

A boundary of the high-concentration p-type semiconductor region 203-3 makes contact with a boundary of the intermediate-concentration p-type semiconductor region 203-1, and a boundary of the high-concentration n-type semiconductor region 203-4 makes contact with a boundary of the intermediate-concentration n-type semiconductor region 203-2. The boundaries may overlap to be subjected to doping. The rib portion A0 has a p-n junction structure in which the intermediate-concentration p-type semiconductor region 203-1 makes contact with the intermediate-concentration n-type semiconductor region 203-2. The other example may include a p-i-n junction structure in which an i-type (intrinsic) semiconductor region is interposed between the intermediate-concentration p-type semiconductor region 203-1 and the intermediate-concentration n-type semiconductor region 203-2.

The traveling wave electrode 121 is connected to the high-concentration p-type semiconductor region 203-3, and traveling wave electrode 122 is connected to the high-concentration n-type semiconductor region 203-4. An inversely-biased electrical field is applied to the p-n junction portion or the p-i-n junction portion by the traveling wave electrodes 121 and 122 to change a carrier density in the inside of the rib portion A0 of the Si semiconductor layer 203 and change a refraction index of the Si semiconductor layer 203 (carrier plasma effect), making it possible to modulate the phase of the light.

Since a dimension of the Si semiconductor layer 203 depends on refraction indexes of materials as the core and clad, it cannot be determined uniquely. Referring to one example thereof, generally in a case of having the rib waveguide structure provided with the rib portion A0, and the slab portions A1 and A2 at both the sides of the rib portion A0 in the Si semiconductor layer, the dimension has approximately a core width 400 to 600 nm (a rib width of the Si semiconductor layer 203)×a height 150 to 300 nm×a slab thickness 50 to 200 nm×a length of several mm in the Si optical waveguide 123.

The optical modulator is required to be small in an optical loss for transmitting the modulated optical signal for a long distance. Since a part of the light propagated by carriers such as electrons/holes is absorbed in the p-type/n-type doped conductive semiconductor layer in the optical waveguide, it is necessary to set a condition of the doping in such a manner as to control the carrier concentration to be a constant value or less to suppress the optical loss. In regard to a carrier density in the doped region, the carrier density is approximately $10^{20}$ [cm$^{-3}$] in a high-concentration p-type semiconductor region 203-3 (p$^{++}$), the carrier density is approximately $10^{17-18}$ [cm$^{-3}$] in an intermediate-concentration p-type semiconductor region 203-1 (p$^{+}$), the carrier density is approximately $10^{17-18}$ [cm$^{-3}$] in an intermediate-concentration n-type semiconductor region 203-2 (n$^{+}$) and the carrier density is approximately $10^{20}$ [cm$^{-3}$] in a high-concentration n-type semiconductor region 203-4 (n$^{++}$).

The light is confined in the Si semiconductor layer 203 higher in a refraction index than the SiO$_2$ clad layers 202 and 204 in the periphery of the Si semiconductor layer 203, and propagates in the x axis forward direction in FIG. 1. The high-concentration p-type semiconductor region 203-3 and the high-concentration n-type semiconductor region 203-4 each are provided to secure conduction having a small contact resistance with the traveling wave electrode and to suppress electrical resistances of the semiconductor layers themselves configuring the Si semiconductor layer 203 to be small. On the other hand, a carrier density of the intermediate-concentration p-type semiconductor region 203-1 and a carrier density of the intermediate-concentration n-type semiconductor region 203-2 configuring the rib portion A0 as the core are set to be lower than that of the high-concentration p-type semiconductor region 203-3 and that of the high-concentration n-type semiconductor region 203-4. This is because since the carrier generated by the doping absorbs the light, the doping concentration is required to be lowered to reduce the optical loss. By lowering the doping concentration, the optical loss in the optical waveguide is 3 dB/cm in a passive optical waveguide not doped, and on the other hand, can be suppressed to be approximately 6 dB/cm. Since a field of the light propagating in the rib portion A0 of the Si semiconductor layer 203 is distributed to leak also outside of the region of the rib portion A0, when the high-concentration p-type semiconductor region 203-3 and the high-concentration n-type semiconductor region 203-4 are arranged to be close to the rib portion A0, the optical loss of the optical waveguide 123 increases. Accordingly, for preventing the high-concentration p-type semiconductor region 203-3 and the high-concentration n-type semiconductor region 203-4 from being arranged to be close to the rib portion A0, it is preferable that a distance $w_{pn}$ between the high-concentration p-type semiconductor region 203-3 and the high-concentration n-type semiconductor region 203-4 is 1600 nm or more.

For realizing an optical modulator that is fast in a modulation speed, low in an optical loss and low in a drive voltage, it is required to realize an optical waveguide structure that is low in a loss and low in reflection to be capable of propagating the light without reducing intensity of the light in the waveguide, to cause an operation frequency band to be a high frequency, and to lower an phase inversion voltage Vπ.

Here, in the MZ type optical modulator, a modulation efficiency is found by a phase inversion voltage Vπ×a length L of a traveling wave (phase modulation) electrode. Then, when the length L of the traveling wave electrode is made short without changing the modulation efficiency to make the optical loss small, the phase inversion voltage Vπ is made large and the drive voltage increases. On the other hand, there is a tradeoff relation that when the phase inversion voltage Vπ is small, the length L of the traveling wave electrode is large to increase the optical loss of the phase modulation portion. Therefore, for realizing the optical modulator low in an optical loss and low in a drive voltage, it is necessary to enable a high-speed operation even if the length L of the traveling wave electrode is long. When the length L of the traveling wave electrode can be set long, it is not necessary to increase the phase inversion voltage Vπ to be large.

For suppressing the optical loss of the optical waveguide 123 in the conventional MZ type optical modulator 100 in FIG. 1, the light is required to be confined in the rib portion A0 of the Si semiconductor layer 203 as the core of the optical waveguide 123. For confining the light in the rib portion A0, it is required to have the rib structure in which the first slab portion A1 and the second slab portion A2 in both the sides of the rib portion A0, which are sections where the light leaks out of the rib portion A0, are thinned. As a result, there occurs a problem that a resistance value of the Si semiconductor layer 203 cannot be lowered by thickening the intermediate-concentration p-type semiconductor region 203-1 and the intermediate-concentration n-type semiconductor region 203-2, and the phase inversion voltage Vπ cannot be made small.

In addition, as described above, since the doping concentration in the vicinity of the rib portion A0 (core of the optical waveguide) in the Si semiconductor layer 203 cannot be made to a high concentration, an electrical resistance value of the p-n junction portion or the p-i-n junction portion of the semiconductor configuring the Si semiconductor layer 203 cannot be lowered largely. Therefore the resistance value of the Si semiconductor layer 203 causes a loss of the high-frequency electrical signal and the voltage to be applied to the p-i-n junction portion or the p-n junction portion is attenuated, posing a problem that the phase inversion voltage Vπ cannot be made small.

The present invention is made in view of this problem, and an object of the present invention is to provide an MZ type optical modulator that can simultaneously realize requirements of being fast in a modulation speed, low in an optical loss and low in a drive voltage.

CITATION LIST

Non Patent Literature

NPL 1: Kazuhiro Goi, Kenji Oda, Hiroyuki Kusaka, Kensuke Ogawa, Tsung-Yang Liow, Xiaoguang Tu, Guo-Qiang Lo, Dim-Lee Kwong, [Binary phase modulation characteristics of 20 Gbps in Si Mach-Zehnder push-pull modulator] The institute of Electronics, Information and Communication Engineers, Society Conference in 2012, C-3-50, 2012.

SUMMARY OF THE INVENTION

According to a first aspect of the present invention, an optical modulator comprises: a substrate; and a phase modulation portion on the substrate, the phase modulation portion including an optical waveguide comprised of a first clad layer, a semiconductor layer that is laminated on the first clad layer and has a refraction index higher than the first clad layer and a second clad layer that is laminated on the semiconductor layer and has a refraction index lower than the semiconductor layer, a first traveling wave electrode, and a second traveling wave electrode, wherein the semiconductor layer includes a rib that is formed in the optical waveguide in an optical axis direction and is a core of the optical waveguide, a first slab that is formed in the optical axis direction in one side of the rib, a second slab that is formed in the optical axis direction in the other side of the rib, a third slab that is formed in the first slab in the optical axis direction at the opposite side to the rib and a fourth slab that is formed in the second slab in the optical axis direction at the opposite side to the rib, and wherein the first slab is formed to be thinner than the rib and the third slab, and the second slab is formed to be thinner than the rib and the fourth slab.

In the optical modulator according to the present invention, since it is possible to lower the electrical resistance value of the semiconductor section largely, the loss of the high-frequency electrical signal is small and the high-speed operation is made possible. In addition, since leakage of the light from the Si semiconductor layer as the optical waveguide core is small, it is possible to suppress absorption of the light by the carrier in the doping region and a highly-efficient optical modulation is made possible. Therefore, it is possible to provide an optical modulator that can simultaneously realize requirements of being fast in a modulation speed, low in an optical loss and low in a drive voltage.

BRIEF DESCRIPTION OF THE DRAWINGS

FIG. 9A is a diagram illustrating a comparison of an electrical field intensity distribution in a p-n junction portion of the conventional MZ type optical modulator and illustrates an electrical field intensity distribution in a p-n junction portion of the conventional MZ type optical modulator 100;

DESCRIPTION OF EMBODIMENTS

Hereinafter, an explanation will be made of embodiments of the present invention with reference to the accompanying drawings.

First Embodiment

Figure 3:
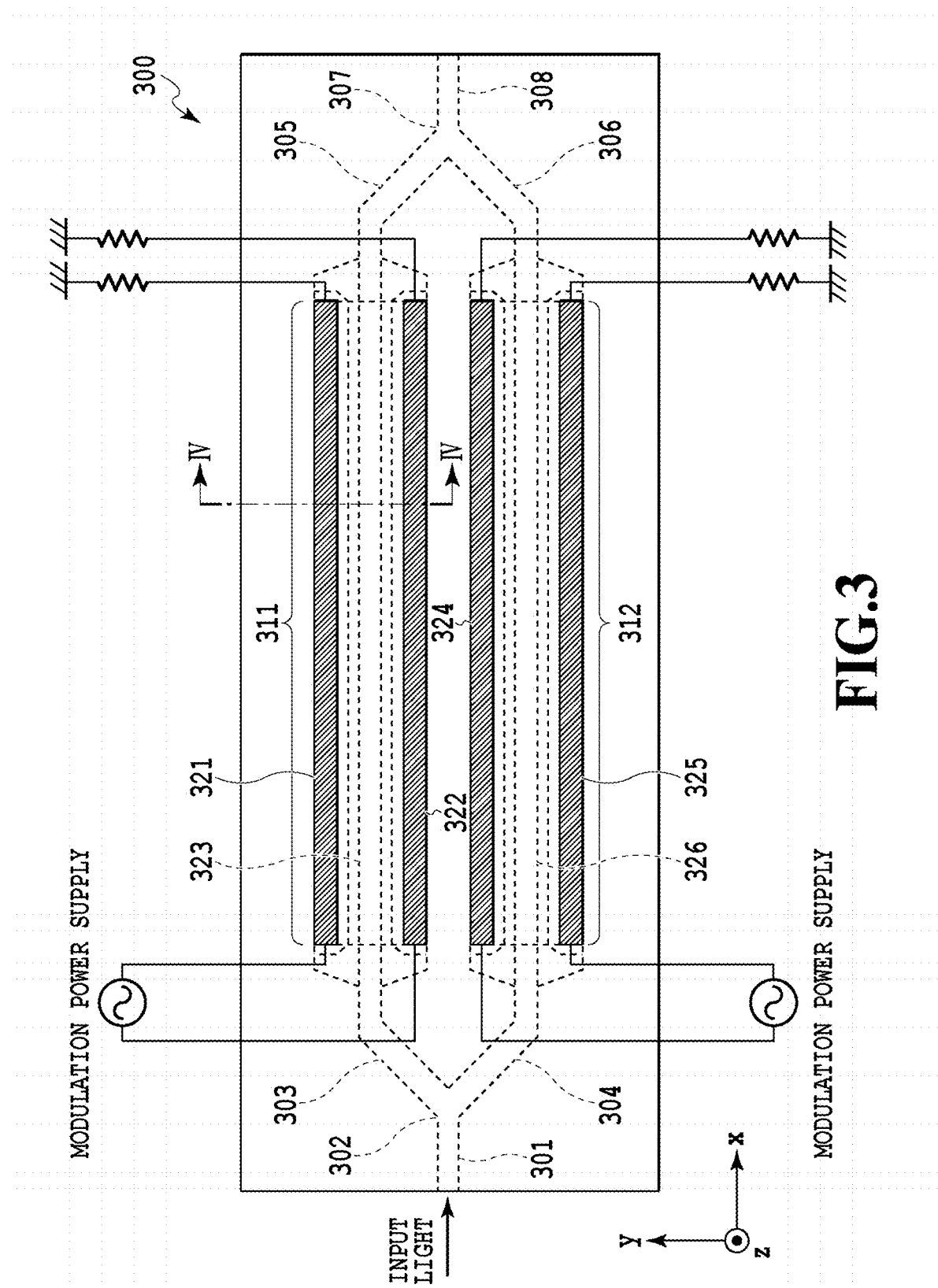
FIG. 3 is an upper view illustrating the configuration of an MZ type optical modulator according to a first embodiment of the present invention.

FIG. 3 is an upper surface transparent view illustrating the configuration of an MZ type optical modulator 300 according to a first embodiment of the present invention. The MZ type 2016-538979 300 is a silicon optical modulator, and includes an optical input waveguide 301, an optical branching filter 302 for branching the light incident from the optical input waveguide 301 in a ratio of 1:1, and optical waveguides 303 and 304 upon which light is incident from the optical branching filter 302. The MZ type optical modulator 300 includes a phase modulation portion 311 that modulates a phase of light propagating in the optical waveguide 303, a phase modulation portion 312 that modulates a phase of light propagating in the optical waveguide 304, an optical waveguide 305 that propagates the light from the phase modulation portion 311, and an optical waveguide 306 that propagates the light from the phase modulation portion 312. The MZ type optical modulator 300 includes an optical multiplexer 307 that multiplexes the lights, which are modulated in a phase, from the optical waveguides 305 and 306, and an output optical waveguide 308 that outputs the light multiplexed by the optical multiplexer 307.

The phase modulation portion 311 includes traveling wave electrodes 321 and 322 and an optical waveguide 323 that extend in an x axis direction, and by applying a voltage to the traveling wave electrodes 321 and 322, changes a phase of light that wave-guides in the optical waveguide 323. The phase modulation portion 312 includes traveling wave electrodes 324 and 325 and an optical waveguide 326 that extend in the x axis direction, and by applying a voltage to the traveling wave electrodes 324 and 325, changes a phase of light that wave-guides in the optical waveguide 326. The optical waveguides 323 and 326 each have the structure called a rib waveguide including: an Si semiconductor layer that is configured of a rib portion as a core of the optical waveguide formed in the optical axis direction and slab portions that are formed in both sides of the rib portion and are thinner than the rib portion; and $SiO_2$ clad layers formed upward and downward of the Si semiconductor layer.

Figure 4:
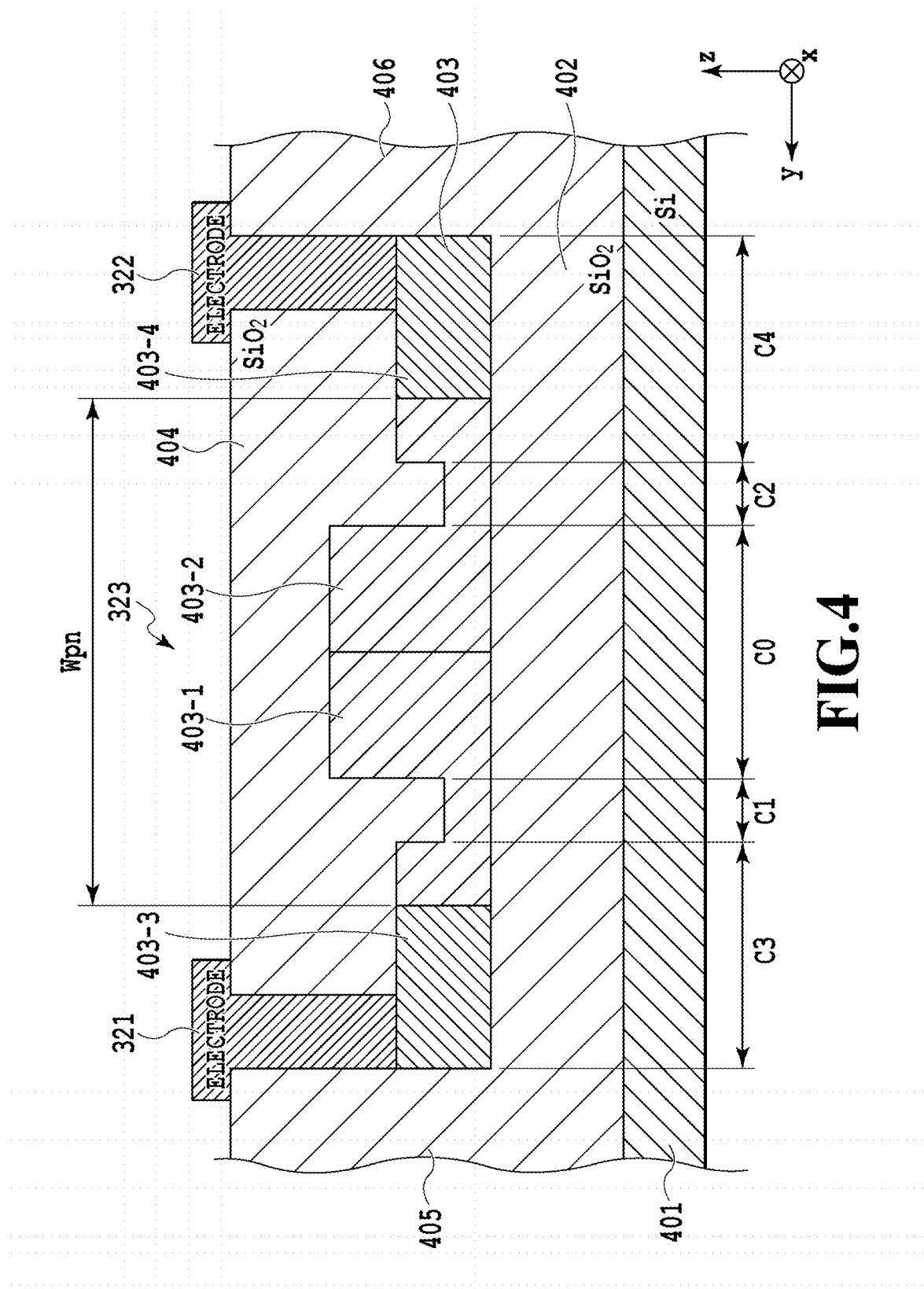
FIG. 4 is a cross section illustrating a phase modulation portion of the MZ type optical modulator, taken in arrows IV-IV in FIG. 3.

FIG. 4 is a cross section illustrating the phase modulation portion 311 of the MZ type optical modulator 300, taken in arrows IV-IV in FIG. 3. FIG. 3 is a cross section illustrating the phase modulation portion 311 in a direction vertical to a waveguide direction of light, and the phase modulation portion 311 includes an Si substrate 401, and the optical waveguide 323 formed on the Si substrate. The optical waveguide 323 includes a first $SiO_2$ clad layer 402 on the Si substrate 401, an Si semiconductor layer 403 on the first $SiO_2$ clad layer 402, and a second $SiO_2$ clad layer 404 on the Si semiconductor layer 403. A third $SiO_2$ clad layer 405 or 406 is formed on both sides of the Si semiconductor layer 403. In addition, alternatively this region may be formed by an Si semiconductor layer having the same thickness with a rib portion C0 as the optical waveguide layer. It should be noted that the phase modulation portion 312 also has the same configuration.

The optical waveguide 323 has the structure of a rib waveguide further deformed, and the Si semiconductor layer 403 in which light wave-guides is interposed between the first $SiO_2$ clad layer 402 and the second $SiO_2$ clad layer 404. The Si semiconductor layer 403 includes the rib portion C0 in an Si semiconductor layer region thicker in the center as a core. The Si semiconductor layer 403 includes a first slab portion C1 and a second slab portion C2 that are arranged in both sides of the rib portion C0 and are Si semiconductor layer regions thinner than the rib portion C0. Further, the Si semiconductor layer 403 includes a third slab portion C3 that is arranged in an end of the first slab portion C1 at the opposite side to the rib portion C0, and is the Si semiconductor layer region thinner than the rib portion C0 and thicker than the first slab portion C1 adjacent thereto, and a fourth slab portion C4 that is arranged in an end of the second slab portion C2 at the opposite side to the rib portion C0, and is the Si semiconductor layer region thinner than the rib portion C0 and thicker than the second slab portion C2 adjacent thereto.

That is, it can be said that the semiconductor layer 403 has the structure that the first slab portion C1 is inserted between the rib portion C0 that is the core of the optical waveguide 323 and the third slab portion C3 formed in one side of the rib portion C0, and the second slab portion C2 is inserted between the rib portion C0 and the fourth slab portion C4 formed in the other side of the rib portion C0.

The optical waveguide 323 confines the light using a difference in a refraction index between the Si semiconductor layer 403, and the first $SiO_2$ clad layer 402 and the second $SiO_2$ clad layer 404 in the periphery of the Si semiconductor 403.

The traveling wave electrode 321 is formed in the x axis direction on an upper surface of an end of the third slab portion C3 in the Si semiconductor layer 403 at the opposite side to the first slab portion C1, and the traveling wave electrode 322 is formed in the x axis direction on an upper surface of an end of the fourth slab portion C4 in the Si semiconductor layer 403 at the opposite side to the second slab portion C2.

The Si semiconductor layer 403 has conductivity by doping of Si with implantation of ions such as boron (B), phosphorous (P) or arsenic (As). Here, the Si semiconductor layer 403 includes five regions that are different in a doping concentration. The end of the third slab portion C3 in the Si semiconductor layer 403 at the opposite side to the first slab portion C1 becomes a high-concentration p-type semiconductor region 403-3, and the end of the fourth slab portion C4 in the Si semiconductor layer 403 at the opposite side to the second slab portion C2 becomes a high-concentration n-type semiconductor region 403-4. The first slab portion C1-side of the third slab portion C3 in the Si semiconductor layer 403, the first slab portion C1 and the first slab portion C1-side of the rib portion C0 become an intermediate-concentration p-type semiconductor region 403-1. The second slab portion C2-side of the fourth slab portion C4 in the Si semiconductor layer 403, the second slab portion C2 and the second slab portion C2-side of the rib portion C0 become an intermediate-concentration n-type semiconductor region 403-2.

A boundary of the high-concentration p-type semiconductor region 403-3 makes contact with a boundary of the intermediate-concentration p-type semiconductor region 403-1, and a boundary of the high-concentration n-type semiconductor region 403-4 makes contact with a boundary of the intermediate-concentration n-type semiconductor region 403-2. The boundaries may be subjected to doping in a state of overlapping. The rib portion C0 has a p-n junction structure in which the intermediate-concentration p-type semiconductor region 403-1 makes contact with the intermediate-concentration n-type semiconductor region 403-2. The other example may include a p-i-n junction structure in which an i-type (intrinsic) semiconductor region is interposed between the intermediate-concentration p-type semiconductor region 403-1 and the intermediate-concentration n-type semiconductor region 403-2.

By applying an inversely-biased electrical field in the p-n junction portion or the p-i-n junction portion of the rib portion C0, a carrier density in the inside of the core (rib portion C0 of the Si semiconductor layer 403) of the optical waveguide 323 changes and a refraction index of the optical waveguide changes (carrier plasma effect), thereby modulating the phase of the light.

Figure 5:
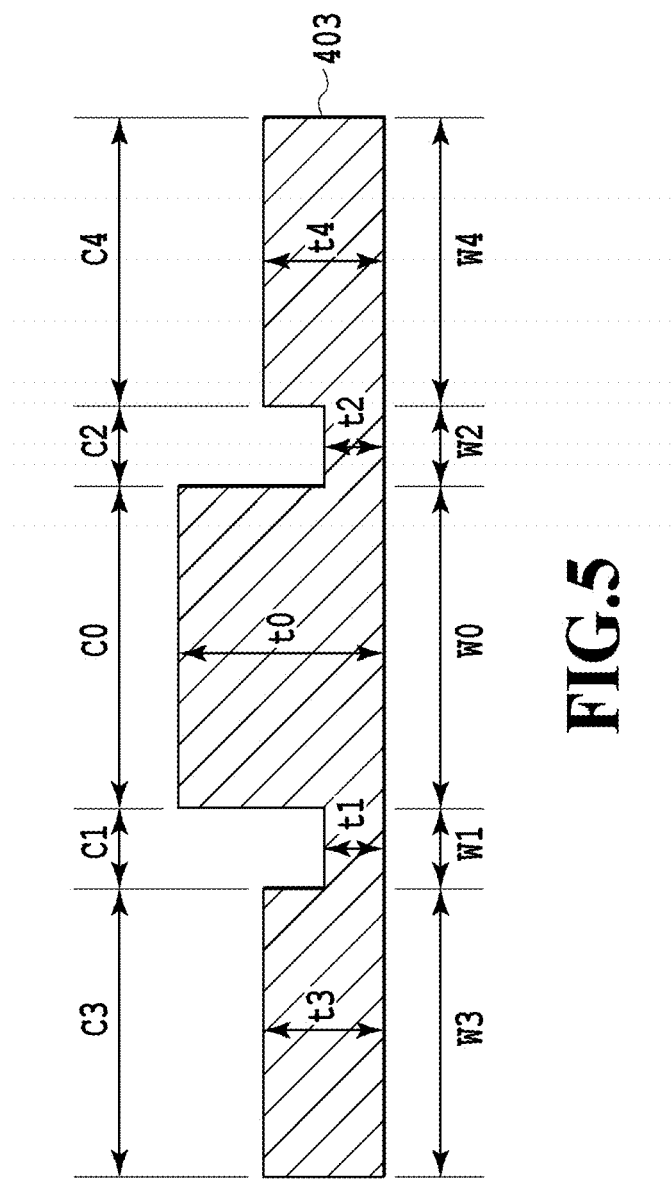
FIG. 5 is a diagram illustrating parameters of each of a rib portion and first to fourth slab portions in a cross-section surface of the optical waveguide described in FIG. 4.

Next, an explanation will be made of a method for determining a dimension of each of the rib portion and the first to fourth slab portions in the cross-section surface of the Si semiconductor layer 403 described in FIG. 4. FIG. 5 is a diagram illustrating parameters of the dimension of each of the rib portion and the first to fourth slab portions in the cross-section surface of the Si semiconductor layer 403 described in FIG. 4. Here, a thickness of the rib portion C0 is indicated at t0, a thickness of the first slab portion C1 is indicated at t1, a thickness of the second slab portion C2 is indicated at t2, a thickness of the third slab portion C3 is indicated at t3 and a thickness of the fourth slab portion C4 is indicated at t4. A width of the rib portion C0 is indicated at w0, a width of the first slab portion C1 is indicated at w1, a width of the second slab portion C2 is indicated at w2, a width of the third slab portion C3 is indicated at w3 and a width of the fourth slab portion C4 is indicated at w4.

First, an explanation will be made of the thickness t0 of the rib portion C0, the thickness t1 of the first slab portion C1, the thickness t2 of the second slab portion C2, the thickness t3 of the third slab portion C3 and the thickness t4 of the fourth slab portion C4. In the optical waveguide 323, the light is confined within the rib portion C0 in the Si semiconductor layer 403 as the core of the optical waveguide 323. Here, when the third slab portion C3 and the fourth slab portion C4, which are Si semiconductor layers having an effective refraction index equivalent to or higher than the rib portion C0, are positioned in close proximity to the rib portion C0, mode coupling is caused and the light transfers to the third slab portion C3 and the fourth slab portion C4 in close proximity to the rib portion C0 in a constant propagation length. Therefore, the light having transferred to the third slab portion C3 and the fourth slab portion C4 in close proximity to the rib portion C0 causes an optical loss of the modulator. The light having transferred to the third slab portion C3 and the fourth slab portion C4 repeats coming and going between the rib portion C0, and the third slab portion C3 and the fourth slab portion C4, causing the loss to vary depending upon a propagating wavelength. Three methods as follows will be conceived for preventing this loss of the light.

First, a first method is not to position the third slab portion C3 and the fourth slab portion C4 in close proximity to the rib portion C0. A second method is to suppress a length of a section, which is in close proximity to the rib portion C0, of each of the third slab portion C3 and the fourth slab portion C4 to be short. A third method is to make an effective refraction index of each of the third slab portion C3 and the fourth slab portion C4 in close proximity to the rib portion C0 smaller than an effective refraction index of the rib portion C0 in which the light is propagating. Hereinafter, the three methods will be considered.

The first method for not positioning the third slab portion C3 and the fourth slab portion C4 in close proximity to the rib portion C0 will be considered. For not positioning the third slab portion C3 and the fourth slab portion C4 in close proximity to the rib portion C0, there is a method of making the width w1 of the first slab portion C1 and the width w2 of the second slab portion C2 large, but as the w1 is the larger, a cross-sectional area of the intermediate-concentration p-type semiconductor region 403-1 becomes the smaller, and as the w2 is the larger, a cross-sectional area of the intermediate-concentration n-type semiconductor region 403-2 becomes the smaller and a resistance of Si semiconductor layer 403 becomes the higher. Accordingly, since the first method results in having the structure that is not different from that of the conventional MZ type optical modulator described in FIG. 1, it becomes difficult to perform the operation at a high-speed frequency. Accordingly, the present invention cannot adopt this method.

The second method for suppressing the length of the section, which is in close proximity to the rib portion C0, of each of the third slab portion C3 and the fourth slab portion C4 to be short will be considered. In the Si semiconductor layer 403, for shortening the length of the section, which is in close proximity to the rib portion C0, of each of the third slab portion C3 and the fourth slab portion C4, the length of the section of each of the third slab portion C3 and the fourth slab portion C4 is made short. That is, it is necessary to shorten an entire length of the phase modulation portion 311. It is possible to suppress the mode coupling by shortening the entire length of the phase modulation portion 311. In this case, however, a length of the traveling wave electrode is also required to be short. Then, since the modulation efficiency is determined by $V\pi L$, it is necessary to increase the phase inversion voltage $V\pi$ for making the modulation efficiency constant. In this case, the MZ type optical modulator 300 cannot be driven in low consumption power, which is difficult to be adopted in the present embodiment.

The third method for making the effective refraction index of each of the third slab portion C3 and the fourth slab portion C4 which are in close proximity to the rib portion C0 smaller than the effective refraction index of the rib portion C0 in which the light is propagating will be considered. For making the effective refraction index of each of the third slab portion C3 and the fourth slab portion C4 which are in close proximity to the rib portion C0 smaller than the effective refraction index of the rib portion C0 in which the light is propagating, a thickness of each of the third slab portion C3 and the fourth slab portion C4 which are in close proximity to the rib portion C0 is made thin to cause the light to leak into the first clad layer 402 and the second clad layer 404 in the upward side and the downward side of the Si semiconductor layer 403, making it possible to realize the third method.

In the present embodiment, a relation of t0, t1 and t3 is made to meet an unequal expression of t0>t3>t1. When the relation of t0, t1 and t3 meets this unequal expression, an effective refraction index of light propagating in the third slab portion C3 can be made smaller than an effective refraction index of the light propagating in the rib portion C0. In addition, a relation of t0, t2 and t4 is made to meet an unequal expression of t0>t4>t2. When the relation of t0, t2 and t4 meets the unequal expression, an effective refraction index of light propagating in the fourth slab portion C4 can be made smaller than an effective refraction index of the light propagating in the rib portion C0. Therefore, even when the rib portion C0 is positioned in close proximity to the third slab portion C3 or the fourth slab portion C4, the optical loss can be suppressed with no transfer of the light to the third slab portion C3 and the fourth slab portion C4. Here, t1 and t2 each may be the same value or a different value, and t3 and t4 each may be the same value or a different value. Further, w1 and w2 each may be the same value or a different value, and w3 and w4 each may be the same value or a different value.

Figure 1:
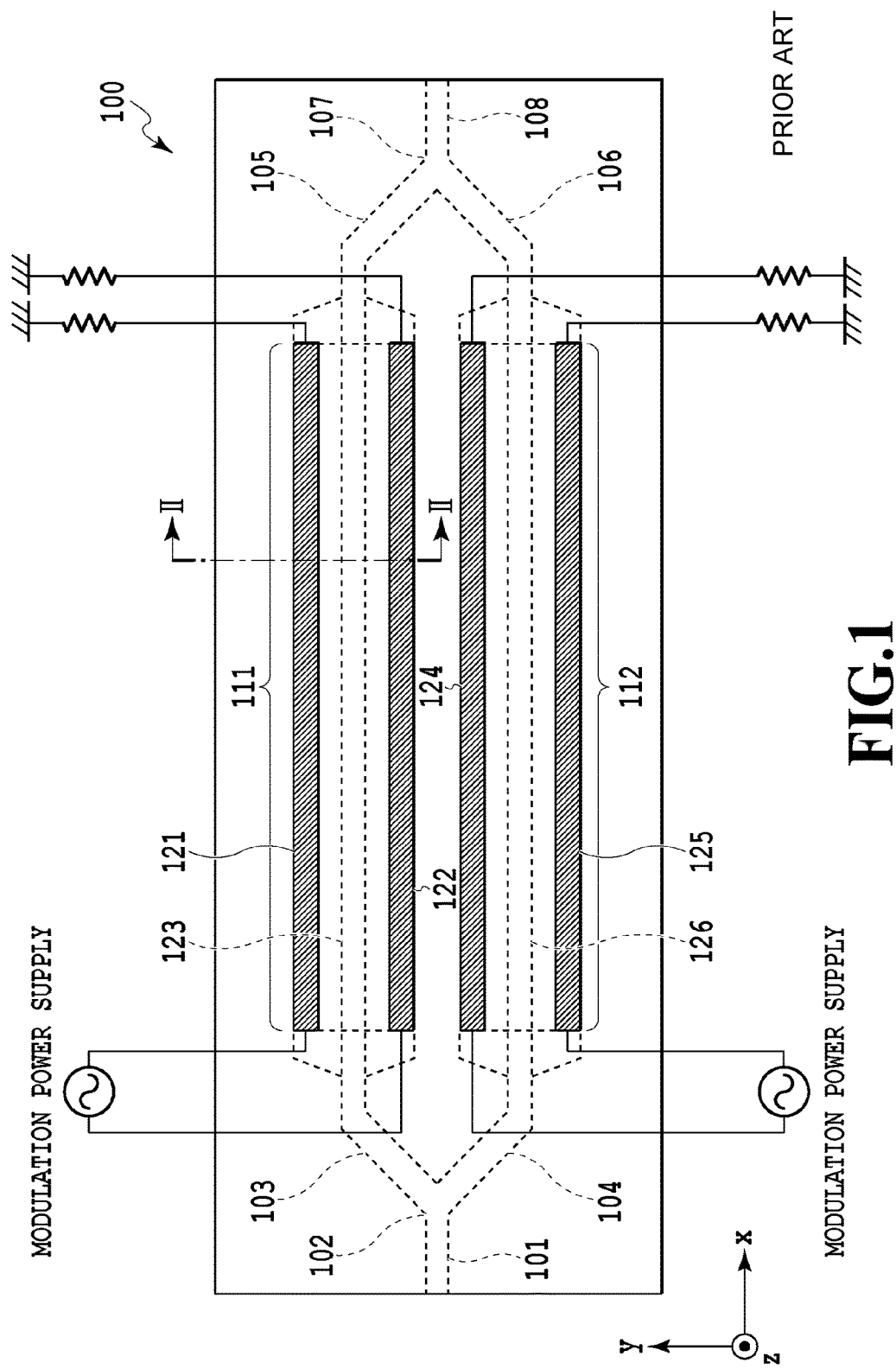
FIG. 1 is an upper view illustrating the configuration of a conventional MZ type optical modulator.
Figure 2:
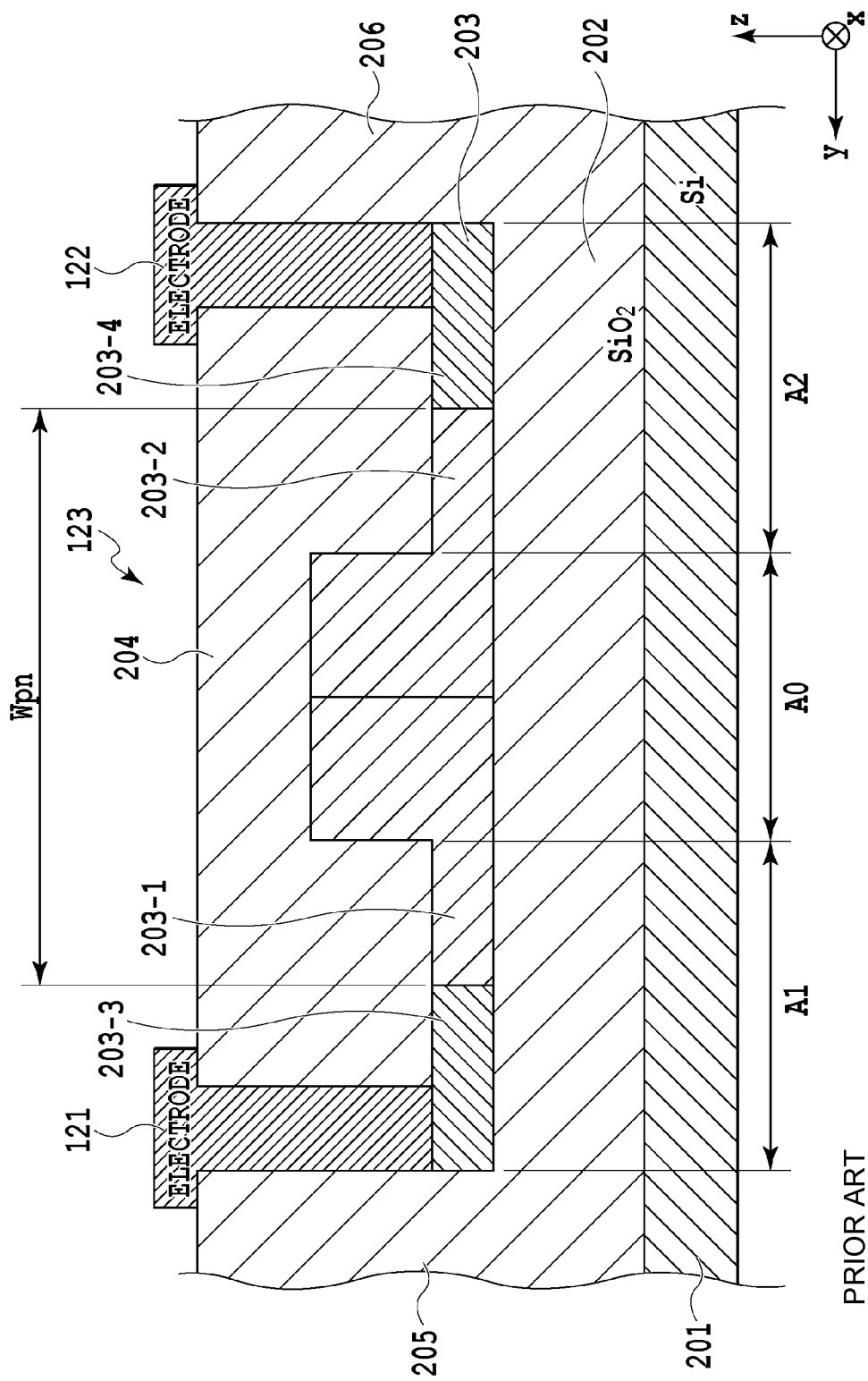
FIG. 2 is a cross section illustrating a phase modulation portion of the conventional MZ type optical modulator, taken in arrows II-II thereof.
Figure 6:
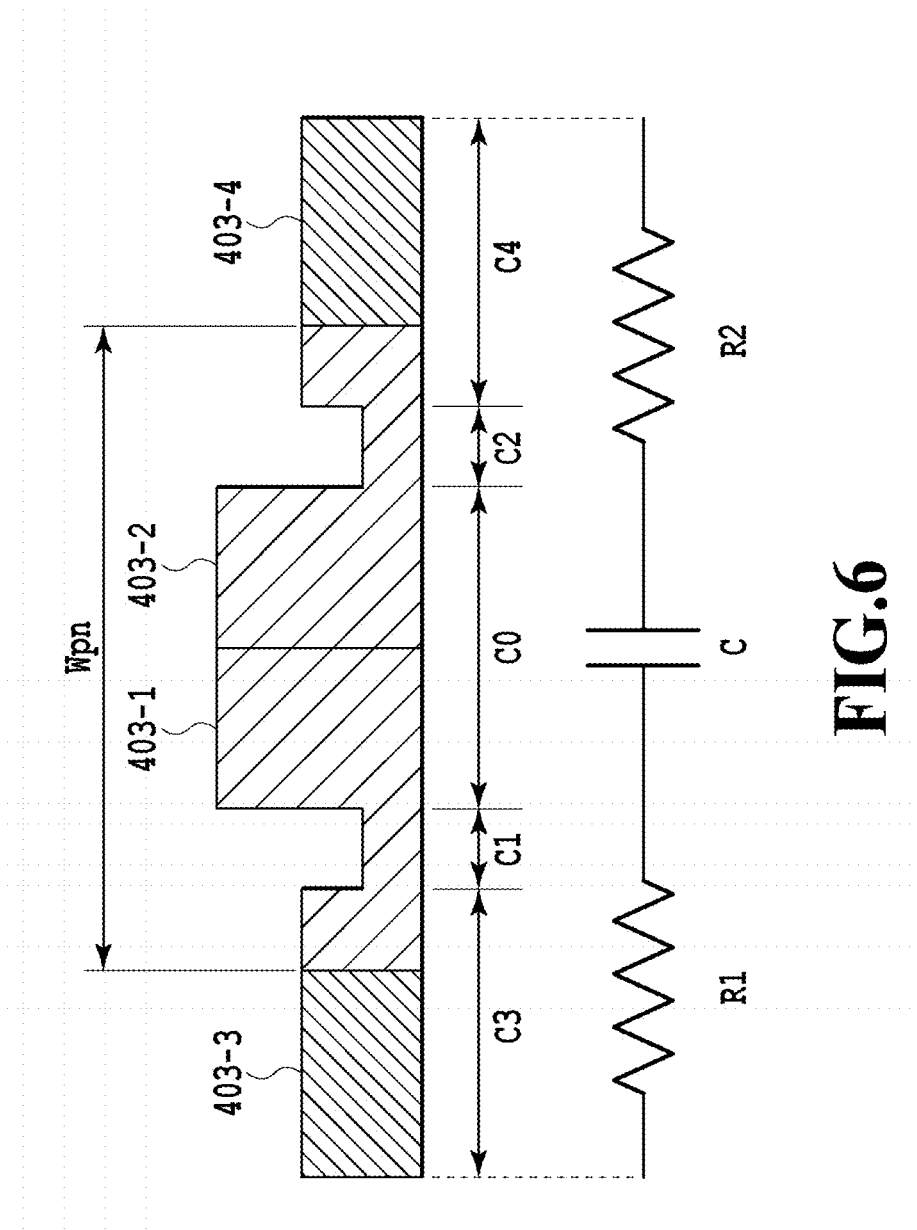
FIG. 6 is a diagram illustrating an equivalent circuit upon viewing the MZ type optical modulator in FIG. 4 as a distributed constant line.

In addition, also in the present embodiment, as similar to the conventional MZ type optical modulator 100 described in FIG. 1, the traveling wave electrode 321 is connected onto the high-concentration p-type semiconductor region 403-3, the traveling wave electrode 322 is connected onto the high-concentration n-type semiconductor region 403-4, and an inversely-biased electrical field is applied on the p-n junction portion or the p-i-n junction portion by the traveling wave electrodes 321 and 322. The application of the voltage changes a carrier density in the inside of the rib portion C0 of the Si semiconductor layer 403 as the core of the optical waveguide 323 (carrier plasma effect) to change a refraction index of the Si semiconductor layer 403, thereby modulating the phase of the light. In the modulation of the phase of the light in the present embodiment, for making it possible to perform high-speed modulation, the traveling wave electrodes 321 and 322 in the MZ type optical modulator 300 are required to be traveling wave electrodes by which a high-frequency electrical signal can propagate for a length of several mm. Here, FIG. 6 is a diagram illustrating an equivalent circuit upon viewing the MZ type optical modulator 300 in FIG. 4 as a distributed constant line. When a capacity of the p-n junction portion (or the p-i-n junction portion) is indicated at C, a resistance from the traveling wave electrode 321 to the p-n junction portion (or the p-i-n junction portion) is indicated at R1 and a resistance from the traveling wave electrode 322 to the p-n junction portion (or the p-i-n junction portion) is indicated at R2, the equivalent circuit can be described as a series circuit of R1-C-R2. In this series circuit, it is necessary to reduce a resistance value of each of the resistances R1 and R2 to be small for realizing a traveling wave electrode that is small in attenuation. Here, the resistance value depends upon the intermediate-concentration p-type semiconductor region 403-1 and the intermediate-concentration n-type semiconductor region 403-2 that are small in a carrier density.

Two methods as follows will be conceived for lowering the resistance of each of the resistances R1 and R2. First of all, the first method is to increase a doping concentration of each of the intermediate-concentration p-type semiconductor region 403-1 and the intermediate-concentration n-type semiconductor region 403-2 to increase the carrier density.

The second method is to thicken the first slab portion C1 and the second slab portion C2 in both the sides of the rib portion C0.

First, the first method will be considered. Increasing the doping concentration and the carrier density of the intermediate-concentration p-type semiconductor region 403-1 and the intermediate-concentration n-type semiconductor region 403-2 leads to increasing a doping concentration of the rib portion C0 in the Si semiconductor layer 403 as the core of the optical waveguide 323. In this case, in a doping region of the rib portion C0 in the Si semiconductor layer 403, since optical absorption by the carrier is made large, it is not possible to suppress the optical loss of the optical waveguide 323. Accordingly, the first method is not appropriate in the present embodiment.

Next, the second method will be considered. In the present embodiment, the third slab portion C3 and the fourth slab portion C4 thicker than the first slab portion C1 and the second slab portion C2 are provided further outside of the first slab portion C1 and the second slab portion C2. Providing the third slab portion C3 and the fourth slab portion C4 causes an increase in a cross-sectional area of each of the intermediate-concentration p-type semiconductor region 403-1 and the intermediate-concentration n-type semiconductor region 403-2. Then, it is possible to lower the resistance value of each of the resistances R1 and R2. At this time, when an optical waveguide in a distance $w_{pn}$ in a region between the high-concentration p-type semiconductor region 403-3 and the high-concentration n-type semiconductor region 403-4 is made as wide as and as thick as possible, it is possible to obtain the better effect.

On the other hand, when the thickness of each of the first slab portion C1 and the second slab portion C2 is made closer to the thickness of the rib portion C0, leak of a field of light into the third slab portion C3 and the fourth slab portion C4 is made large, and the field of the light enters the third slab portion C3 and the fourth slab portion C4 to increase the loss of the optical waveguide. Further, the field of the light existing in a region where the refraction index changes is reduced to be small due to the carrier plasma effect, therefore leading to degradation of the modulation efficiency as well. Therefore it is preferable that the thickness t1 of the first slab portion C1 and the thickness t2 of the second slab portion C2 are a half of the rib portion C0 or less, that is, an unequal expression of t0/2>t1 and an unequal expression of t0/2>t2 are met.

Further, since the high-concentration p-type semiconductor region 403-3 and the high-concentration n-type semiconductor region 403-4 each have a sufficient carrier concentration and are low in resistivity, even when t1 and t2 have the thickness to meet the aforementioned unequal expressions, an increase in the resistance value does not almost influence characteristics of the modulator. Therefore it is preferable to position the boundary between the high-concentration p-type semiconductor region 403-3 and the intermediate-concentration n-type semiconductor region 403-1 and the boundary between the high-concentration p-type semiconductor region 403-3 and the intermediate-concentration n-type semiconductor region 403-2 respectively in a region of the third slab portion C3 of the thickness t3 and in a region of the fourth slab portion C4 of the thickness t4 formed outside of the first slab portion C1 and the second slab portion C2, because the most effect of the invention can be obtained.

Next, the width w0 of the rib portion C0, the width w1 of the first slab portion C1, the width w2 of the second slab portion C2, the width w3 of the third slab portion C3 and the width w4 of the fourth slab portion C4 will be explained. In the present embodiment, as described before, in a case where the width w1 of the first slab portion C1 and the width w2 of the second slab portion C2 are made as small as possible, it is possible to obtain the more effect. However, since aligning accuracy of a photo mask at the production of the MZ type optical modulator 300 is approximately ±60 nm, if the width of each of w1 and w2 is set to 60 nm or less, it is assumed that w1 and w2 will not be formed due to variations at the production. Then, since the neighbors of the rib portion C0 are the third slab portion C3 and the fourth slab portion C4 having the second thickness to the rib portion C0, the field of the light leaks largely from the rib portion C0 to cause an increase in an optical loss or a reduction in a modulation efficiency. On the other hand, when w1 and w2 are large, the structure is closer to the structure of the conventional MZ type optical modulator 100 illustrated in FIG. 1 to reduce the effect of the present invention. Here, Table 1 illustrates an electrical field intensity of a phase modulation portion, an increase rate of an electrical field intensity in the MZ type modulator 300 in comparison with the conventional MZ type optical modulator 100 (FIG. 1) and a calculation value of an attenuation constant α of a high-frequency signal in the MZ type optical modulator 300, at the time of changing values of w1 and w2 in the MZ type modulator 300 in FIG. 5. An example in Table 1 illustrates calculation values when a modulation frequency is 10 GHz.

TABLE 1

| | Electrical field intensity (V/m) | Increase rate in electrical field intensity | Attenuation constant α (Np/m) |
|---|---|---|---|
| MZ type optical modulator 100 (FIG. 1: conventional structure) | 1.64E+07 | 0 | 85.5 |
| w1 (w2) = 1000 nm | 1.66E+07 | 1.1% | 83.8 |
| w1 (w2) = 400 nm | 1.91E+07 | 16.2% | 75.1 |
| w1 (w2) = 200 nm | 2.06E+07 | 25.6% | 67.1 |

The electrical field intensity, as compared to the conventional MZ type optical modulator 100, increases by 25.6% when w1 (w2) is 200 nm, and by 16.2% when w1 (w2) is 400 nm, but by 1.1% only when w1 (w2) is 1000 nm, by which the effect of the invention cannot be nearly obtained. Therefore it is preferable to set the value of w1 to a value to meet the unequal expression of 60 nm<w1 (w2)<600 nm, because it is possible to obtain the maximum effect of the invention.

Si semiconductor layers having the same thickness with the rib portion C0 as the optical waveguide layer can be formed outside of the third slab portion C3 and the fourth slab portion C4. In this case, when the Si semiconductor layer having the same thickness as the rib portion C0 exists in the region in close proximity to the rib portion C0 in which the light wave-guides, since the light propagating in the rib portion C0 leaks into the Si semiconductor layer having the same thickness in close proximity to the rib portion C0, the width w3 of the third slab portion C3 and the width w4 of the fourth slab portion C4 are required to be 200 nm or more in such a manner that the rib portion C0 is not positioned in close proximity to the outside Si semiconductor layer.

Examples

The MZ type optical modulator 300 was produced in a size of a cross-sectional structure of the Si semiconductor layer 403 as follows as an example, based upon the thickness t0 of the rib portion C0, the thickness t1 of the first slab portion C1, the thickness t2 of the second slab portion C2, the thickness t3 of the third slab portion C3, the thickness t4 of the fourth slab portion C4, the width w0 of the rib portion C0, the width w1 of the first slab portion C1, the width w2 of the second slab portion C2, the width w3 of the third slab portion C3 and the width w4 of the fourth slab portion C4, which were calculated as described above. In addition, the doping concentrations are as follows.

Figure 7:
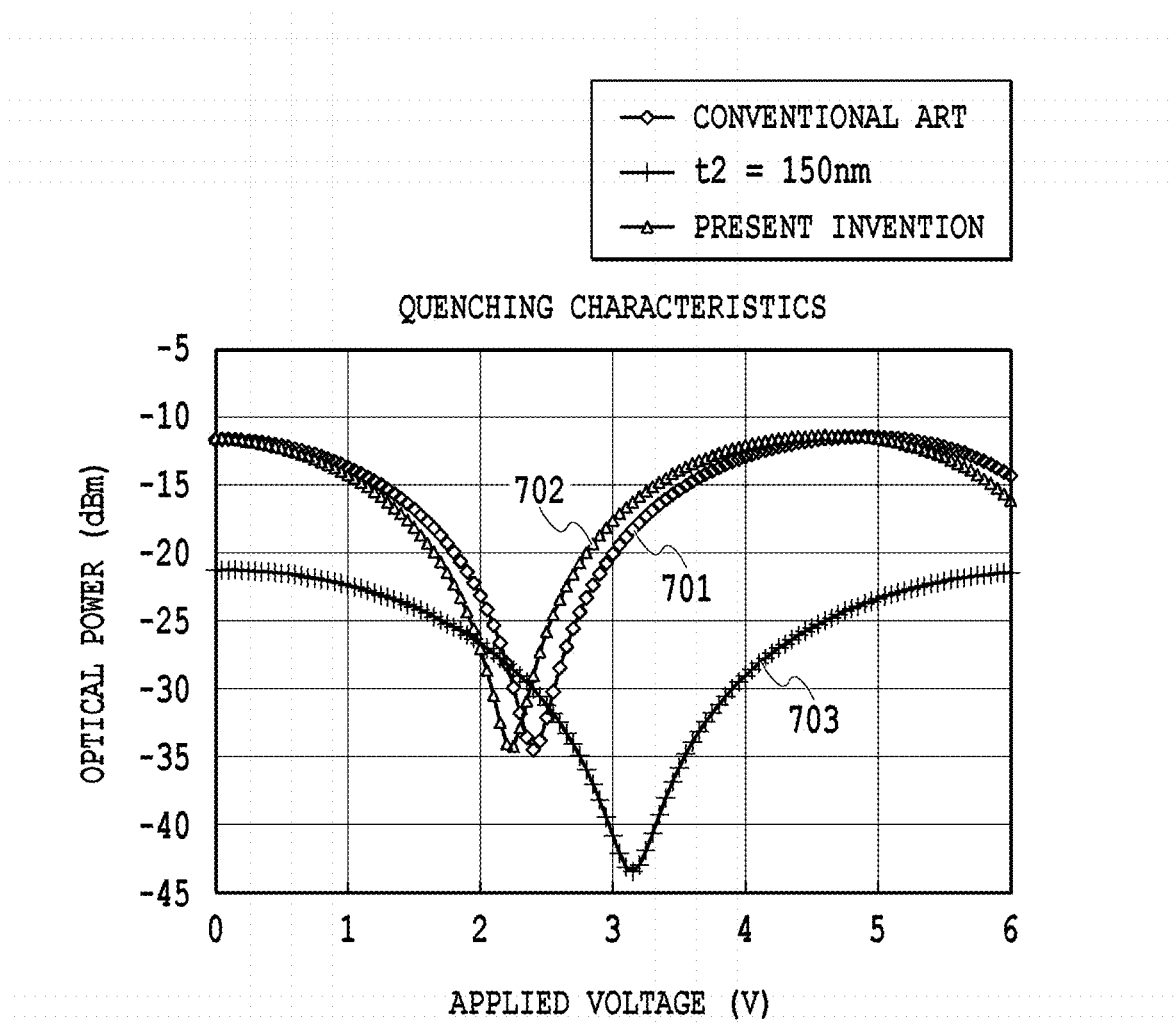
FIG. 7 is a graph illustrating a relation of quenching characteristics of the conventional MZ type optical modulator, quenching characteristics of an MZ type optical modulator produced by a dimension according to an embodiment, and quenching characteristics of an MZ type optical modulator produced as t1=t2=t3=t4=150 nm.

Rib Portion C0
  t0=220 nm w0=500 nm
First Slab Portion C1
  t1=80 nm w1=100 nm
Second Slab Portion C2
  t2=80 nm w2=100 nm
Third Slab Portion C3
  t3=150 nm w3>200 nm
Fourth Slab Portion C4
  t4=150 nm w4>200 nm
High-Concentration p-Type Semiconductor Region 403-3
  $p^{++}$: $1 \times 10^{20}$ cm$^{-3}$
High-Concentration n-Type Semiconductor Region 403-4
  $n^{++}$: $1 \times 10^{20}$ cm$^{-3}$
Intermediate-Concentration p-Type Semiconductor Region 403-1
  $p^{+}$: $2.7 \times 10^{17}$ cm
Intermediate-Concentration n-Type Semiconductor Region 403-2
  $n^{+}$: $3.0 \times 10^{17}$ cm$^{-3}$ FIG. 7 is a diagram illustrating a relation of quenching characteristics of the conventional MZ type optical modulator 100 (FIG. 1), quenching characteristics of the MZ type optical modulator 300 produced by the dimension according to the present embodiment, and quenching characteristics of the MZ type optical modulator produced as t1=t2=t3=t4=150 nm. In FIG. 7, the quenching characteristics of the conventional MZ type optical modulator 100 is illustrated in a curved line 701, the quenching characteristics of the MZ type optical modulator 300 produced by the dimension according to the present embodiment is illustrated in a curved line 702 and the quenching characteristics of the MZ type optical modulator produced as t1=t2=t3=t4=150 nm is illustrated in a curved line 703. When a voltage is applied to the phase modulation portion in the MZ type optical modulator, phases of lights propagating in two optical waveguides in an MZ interference system change, the optical intensity is once reduced, and thereafter, the phase-inversed light is outputted. In the quenching characteristics (curved line 701) of the MZ type optical modulator produced as t1=t2=t3=t4=150 nm, an optical loss is large since the field of the light leaks from the rib portion as a core. In addition, it is found out that since the field of the light existing in a region where the refraction index changes is reduced to be small due to the carrier plasma effect, the modulation efficiency is degraded. Therefore it is found out that it is preferable that a relation of t0, t1 and t3 meets an unequal expression of t0>t3>t1 as in the case of the present embodiment and a relation of t0/2>t4 is met. Further, it is found out that it is preferable that a relation of t0, t2 and t4 also meets an unequal expression of t0>t4>t2 and a relation of t0/2>t4 is met.

FIG. 8 is graphs each illustrating a comparison in a calculation value of electrical frequency characteristics (S-parameter) of a modulator between the conventional MZ type optical modulator 100 and the MZ type optical modulator 300 produced according to the present embodiment.

Figure 8A:
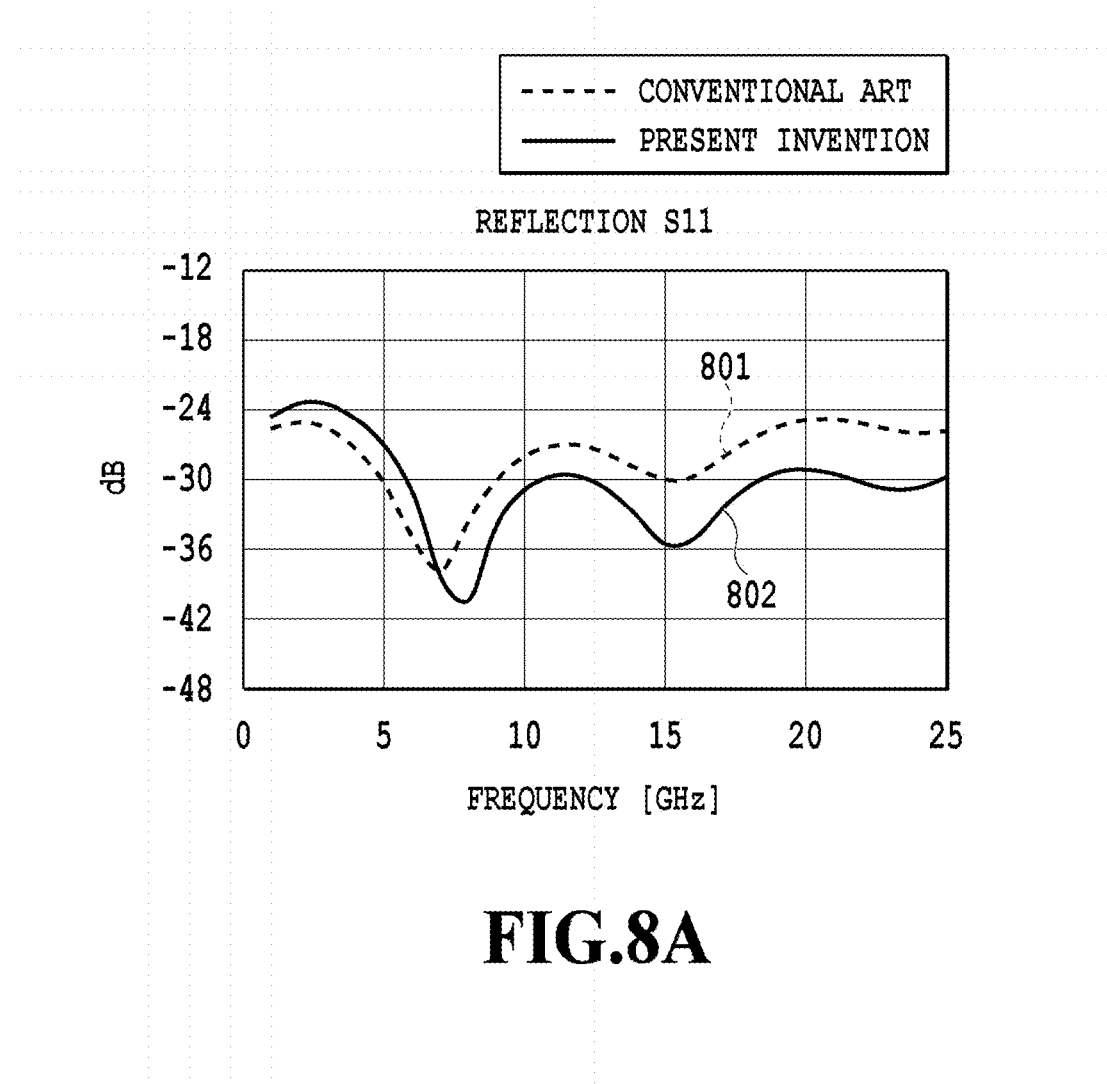
FIG. 8A is a graph illustrating a comparison in a calculation value of electrical frequency characteristics of a modulator between the conventional MZ type optical modulator and the MZ type optical modulator produced according to an embodiment, and illustrates frequency characteristics of a reflected signal.
Figure 8B:
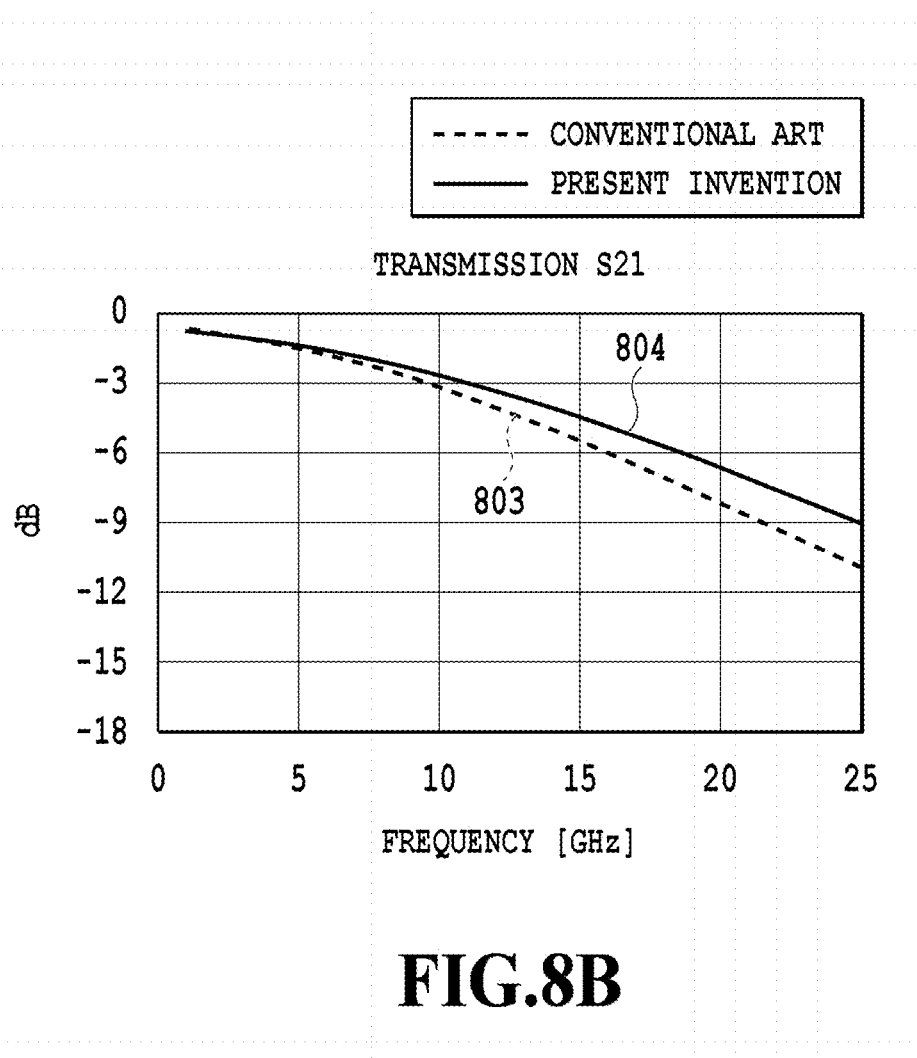
FIG. 8B is a graph illustrating a comparison in a calculation value of electrical frequency characteristics of a modulator between the conventional MZ type optical modulator and the MZ type optical modulator produced according to an embodiment, and illustrates frequency characteristics of a transmission signal.

FIG. 8A illustrates frequency characteristics of a reflected signal (S11) and FIG. 8B illustrates frequency characteristics of a transmission signal (S21). Here, in FIG. 8A, the frequency characteristics of the reflected signal (S11) of the conventional MZ type optical modulator 100 are illustrated in a curved line 801, and the frequency characteristics of the reflected signal (S11) of the MZ type optical modulator 300 in the present embodiment are illustrated in a curved line 802. The frequency characteristics of the transmission signal (S21) of the conventional MZ type optical modulator 100 are illustrated in a curved line 803, and the frequency characteristics of the transmission signal (S21) of the MZ type optical modulator 300 in the present embodiment are illustrated in a curved line 804. In the MZ type optical modulator 300 in the present embodiment, it is found out that since the loss of the high-frequency electrical signal in the traveling wave electrode is small, the attenuation of the transmission signal (S21) is small and a frequency band defined in 6 dB is 18 GHz, which is larger than 16 GHz of the conventional MZ type optical modulator 100.

Figure 9B:
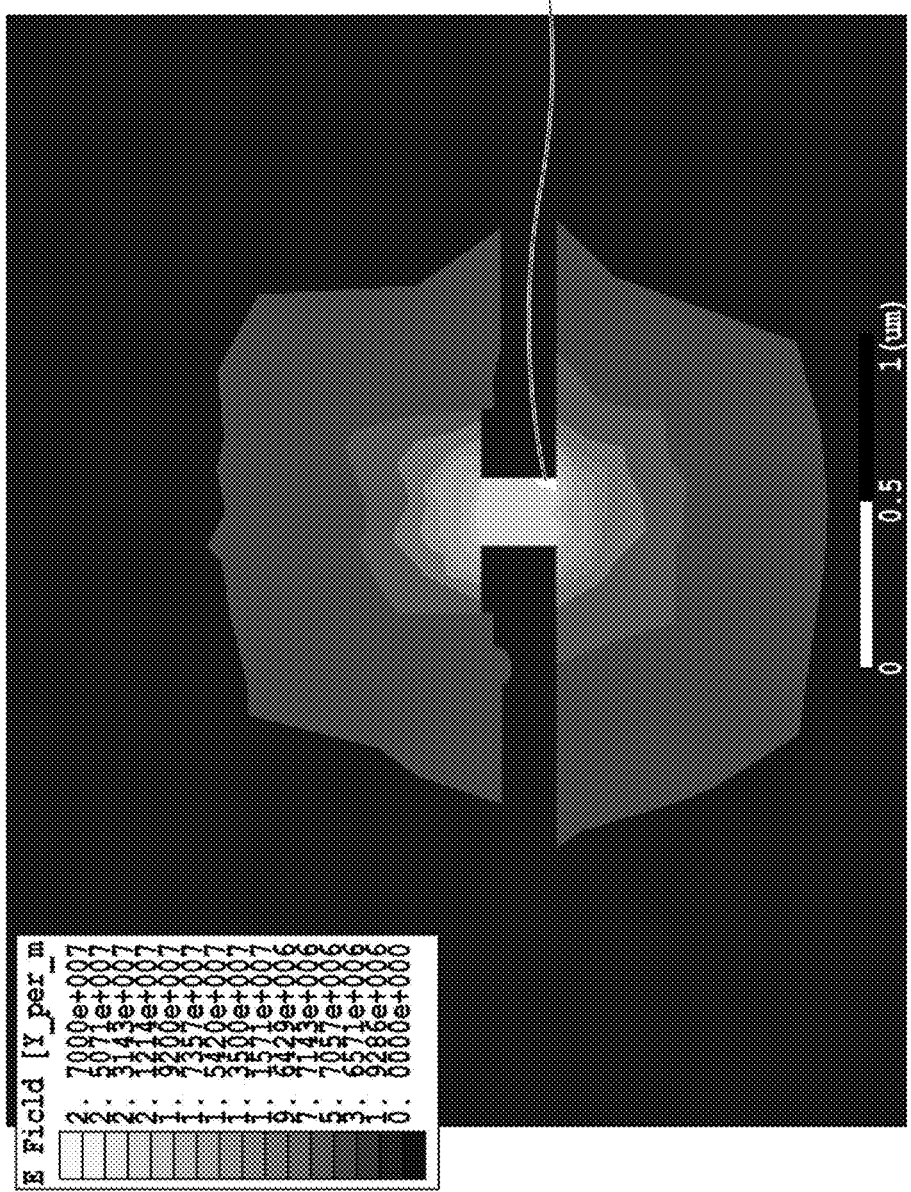
FIG. 9B is a diagram illustrating a comparison of an electrical field intensity distribution in a p-n junction portion of an MZ type optical modulator and illustrates an electrical field intensity distribution in a p-n junction portion of an MZ type optical modulator 200 in the present embodiment.

FIG. 9 is diagrams each illustrating a comparison of an electrical field intensity distribution in a p-n junction portion between the conventional MZ type optical modulator 100 and the MZ type optical modulator 300 in the present embodiment. FIG. 9A illustrates an electrical field intensity distribution in a p-n junction portion in the Si semiconductor layer 203 of the conventional MZ type optical modulator 100. FIG. 9B illustrates an electrical field intensity distribution in a p-n junction portion in the Si semiconductor layer 403 of the MZ type optical modulator 300 in the present embodiment. At the time of the modulation frequency of 10 GHz, the electrical field intensity in the p-n junction portion in the Si semiconductor layer 403 in the present embodiment is larger by 25.6% as compared to the electrical field intensity in the p-n junction portion in the conventional Si semiconductor layer 203, and the attenuation constant α is 67.1 Np/m, which is also smaller than 85.5 Np/m in the conventional structure. From the result in FIG. 8 and FIG. 9, it is found out that according to the present invention, it is possible to realize the excellent Si optical modulator that is small in a loss of the high-frequency signal.

Second Embodiment

Figure 10:
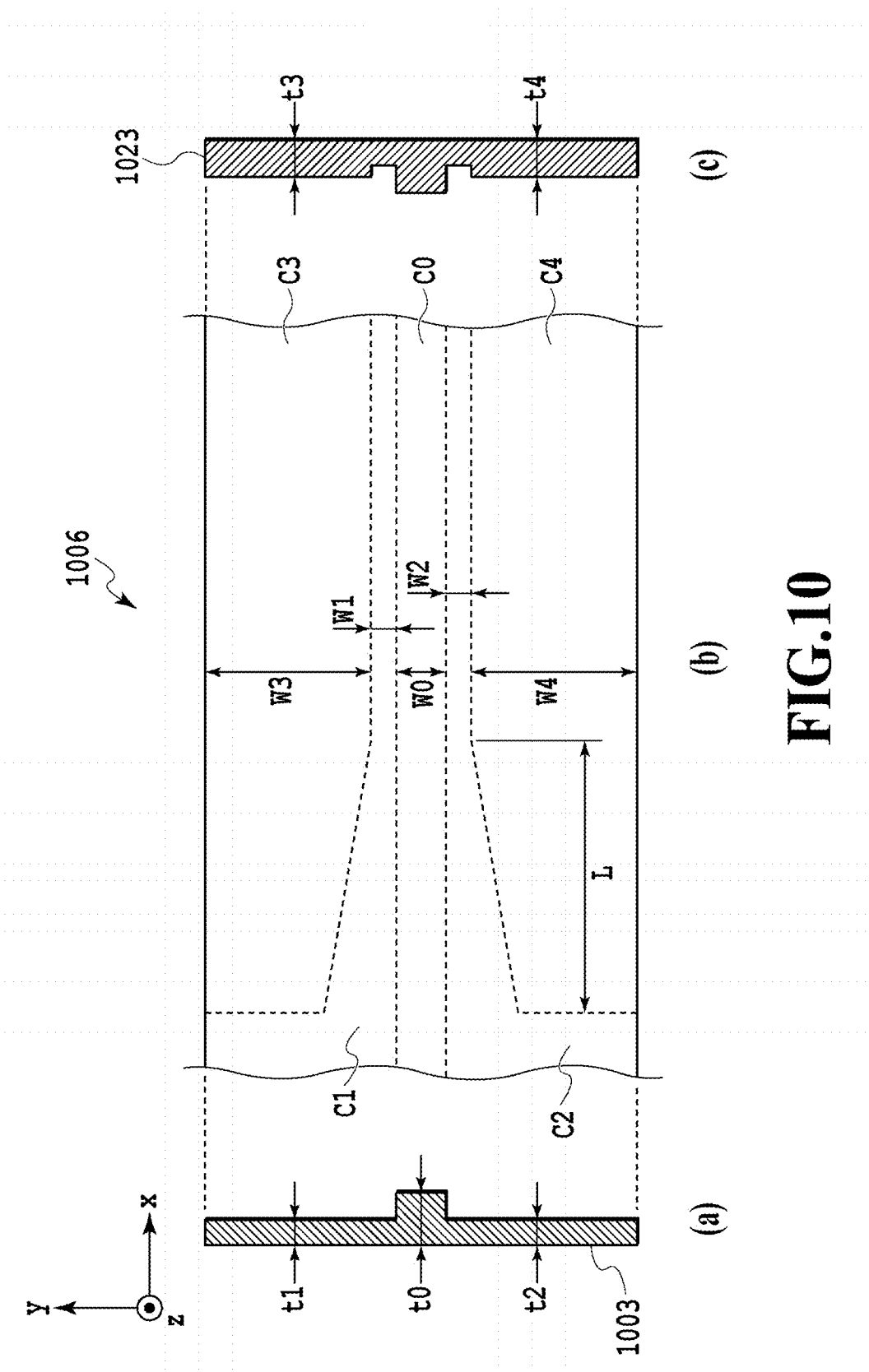
FIG. 10 is an upper surface transparent view illustrating the configuration of an MZ type optical modulator according to a second embodiment of the present invention, and particularly is a diagram illustrating a connecting section between an input optical waveguide and an optical waveguide of a phase modulation portion. (a) is a cross section of the input optical waveguide in a direction vertical to a waveguide direction of light, (b) is an upper surface view of the connecting section between the input optical waveguide and the optical waveguide of the phase modulation portion, and (c) is a cross section of the optical waveguide of the phase modulation portion in the direction vertical to the waveguide direction of the light.

FIG. 10 is an upper surface transparent view illustrating the configuration of an MZ type optical modulator 1000 according to a second embodiment of the present invention, and particularly illustrates a connecting section between an optical waveguide 1003 and an optical waveguide 1023 of a phase modulation portion 1011. FIG. 10(a) is a cross section of the optical waveguide 1003 in a direction vertical to a waveguide direction (x axis direction) of light, FIG. 10(b) is an upper surface transparent view of the connecting section between the optical waveguide 1003 and the optical waveguide 1023 of the phase modulation portion 1011, and FIG. 10(c) is a cross section of the optical waveguide 1023 of the phase modulation portion 1011 in a direction vertical to the waveguide direction (x axis direction) of light. The MZ type optical modulator 1000 according to the second embodiment is configured such that the connecting section between the optical waveguide 303 and the optical waveguide 323 of the phase modulation portion 311 in the MZ type optical modulator 300 in the first embodiment is structured to be that of FIG. 10(b). The incident-side optical waveguide 1003 is connected to the optical waveguide 1023 of the phase modulation portion 1011 in the connection section, and the incident-side optical waveguide 1003 corresponds to the waveguide 303 of the first embodiment, the phase modulation portion 1011 corresponds to the phase modulation portion 311 and the optical waveguide 1023 corresponds to the optical waveguide 323. The optical waveguide 1003 is configured of the rib portion C0, the first slab portion C1 and the second slab portion C2.

In the connecting section, the width in the region of the first slab portion C1 is gradually narrower along with the waveguide direction of the light and becomes the width w1. Likewise, the width in the region of the second slab portion C2 is gradually narrower and becomes the width w2. With the connecting section formed in this manner, the mode field of the light of the rib waveguide 1003 and the optical waveguide 1023 of the phase modulation portion 1011 is gradually changed, making it possible to provide a waveguide connecting portion small in a loss. The field of the light exists in the regions leaking from the rib portion C0 in both of the phase modulation portion and the optical waveguide. Therefore, the effective refraction index of the light propagating in the optical waveguide is subjected to an influence from a refraction index of each of the third slab portion C3 and the fourth slab portion C4. By causing the third slab portion C3 and the fourth slab portion C4 to gradually approach the rib portion C0, a rapid change in the effective retraction index can be prevented to suppress the reflectance loss and the dispersion loss to be small.

Preferably an approaching method of the third slab portion C3 and the fourth slab portion C4 is to perform the approach in a ratio of a length of 10% or less to a length L long enough for the wavelength of light, such as an approach length of 1 μm to a propagation length L of 10 μm.

REFERENCE SIGNS LIST 100, 300 MZ type phase modulator
101, 103, 104, 105, 106, 108, 123, 301, 303, 304, 305, 306, 308, 323 Optical waveguide
102, 302 Optical branching filter
107, 307 Optical multiplexer
111, 112, 311, 312 Phase modulation portion
121, 122, 124, 125, 321, 322, 324, 325 Traveling wave electrode
201, 401 Si substrate
202, 204, 205, 206, 402, 404, 405, 406 SiO$_2$ clad layer
203, 403 Si semiconductor layer
203-3, 403-3 High-concentration p-type semiconductor region
203-4, 403-4 High-concentration n-type semiconductor region
203-1, 403-1 Intermediate-concentration p-type semiconductor region
203-2, 403-2 Intermediate-concentration n-type semiconductor region
A0, C0 Rib portion
A1 to A2, C1 to C4 Slab portion
C Capacity
R1, R2 Resistance

The invention claimed is:

1. A silicon optical modulator comprising:
a substrate; and
a phase modulation portion on the substrate, the phase modulation portion including an optical waveguide comprised of a first clad layer, a semiconductor layer that is laminated on the first clad layer and has a refraction index higher than the first clad layer and a second clad layer that is laminated on the semiconductor layer and has a refraction index lower than the semiconductor layer, a first traveling wave electrode, and a second traveling wave electrode, wherein the semiconductor layer includes:

a rib that is formed in the optical waveguide in an optical axis direction and is a core of the optical waveguide;

a first slab that is formed in the optical axis direction in one side of the rib;

a second slab that is formed in the optical axis direction in the other side of the rib;

a third slab that is formed in the first slab in the optical axis direction at the opposite side to the rib; and a fourth slab that is formed in the second slab in the optical axis direction at the opposite side to the rib, wherein the first slab is formed to be thinner than the rib and the third slab, and the second slab is formed to be thinner than the rib and the fourth slab, wherein when a thickness of the rib is indicated at t0, a thickness of the first slab is indicated at t1 and a thickness of the third slab is indicated at t3, a relation of the thicknesses meets an unequal expression of t0>t3>t1, and when a thickness of the second slab is indicated at t2 and a thickness of the fourth slab is indicated at t4, a relation of the thicknesses meets an unequal expression of t0>t4>t2, wherein:

an end of the third slab at the opposite side to the first slab is a high-concentration p-type semiconductor region and an end of the fourth slab at the opposite side to the second slab is a high-concentration n-type semiconductor region, the first slab-side of the third slab, the first slab and the first slab-side of the rib are an intermediate-concentration p-type semiconductor region, and the second slab-side of the fourth slab, the second slab and the second slab-side of the rib are an intermediate-concentration n-type semiconductor region, a doping concentration of the high-concentration p-type semiconductor region is on the order of $10^{20}$ cm$^{-3}$, a doping concentration of the high-concentration n-type semiconductor region is on the order of $10^{20}$ cm$^{-3}$, a doping concentration of the intermediate-concentration p-type semiconductor region is on the order of $10^{17}$ cm$^{-3}$, and a doping concentration of the intermediate-concentration n-type semiconductor region is on the order of $10^{17}$ cm$^{-3}$.

2. The silicon optical modulator according to claim 1, wherein a relation of the thicknesses further meets an unequal expression of t0/2>t1 and an unequal expression of t0/2>t2.

3. The silicon optical modulator according to claim 2, wherein the first traveling wave electrode is formed in the optical axis direction on an upper surface of an end in the third slab at the opposite side to the rib, and the second traveling wave electrode is formed in the optical axis direction on an upper surface of an end in the fourth slab at the opposite side to the rib.

4. The silicon optical modulator according to claim 1, wherein a junction portion between the intermediate-concentration p-type semiconductor region and the intermediate-concentration n-type semiconductor region has a p-n junction structure.

5. The silicon optical modulator according to claim 1, wherein a junction portion between the intermediate-concentration p-type semiconductor region and the intermediate-concentration n-type semiconductor region has a p-i-n junction structure in which an i-type semiconductor region not doped is further interposed between the intermediate-concentration p-type semiconductor region and the intermediate-concentration n-type semiconductor region.

6. The silicon optical modulator according to claim 2, wherein when a width of the first slab is indicated at w1 and a width of the second slab is indicated at w2, a relation of the w1 meets an unequal expression of 60 nm<w1<600 nm, and a relation of the w2 meets an unequal expression of 60 nm<w2<600 nm.

7. The silicon optical modulator according to claim 1, wherein in a connecting portion between the phase modulation portion and a rib waveguide formed in the optical modulator, a width in a region of each of the first slab and the second slab of the phase modulation portion is gradually narrower toward the phase modulator.

* * * * *